(12) United States Patent
Haine et al.

(10) Patent No.: US 11,592,899 B1
(45) Date of Patent: Feb. 28, 2023

(54) BUTTON ACTIVATION WITHIN AN EYE-CONTROLLED USER INTERFACE

(71) Applicant: Tectus Corporation, Saratoga, CA (US)

(72) Inventors: Dominic Philip Haine, Saratoga, CA (US); Ben Rafael Kimel Green, Saratoga, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 17/513,582

(22) Filed: Oct. 28, 2021

(51) Int. Cl.
*G06F 3/01* (2006.01)
*G06F 3/04817* (2022.01)
*G06F 3/04842* (2022.01)
*G06F 3/0482* (2013.01)
*G06F 3/04847* (2022.01)

(52) U.S. Cl.
CPC ............ *G06F 3/013* (2013.01); *G06F 3/0482* (2013.01); *G06F 3/04817* (2013.01); *G06F 3/04842* (2013.01); *G06F 3/04847* (2013.01)

(58) Field of Classification Search
CPC .... G06F 3/013; G06F 3/04817; G06F 3/0482; G06F 3/04842; G06F 3/04847
See application file for complete search history.

(56) References Cited

U.S. PATENT DOCUMENTS

| | | |
|---|---|---|
| 5,844,544 A | 12/1998 | Kahn |
| 8,430,310 B1 | 4/2013 | Ho |
| 8,520,309 B2 | 8/2013 | Sprague |
| 8,764,185 B1 | 7/2014 | Biederman |
| 8,786,675 B2 | 7/2014 | Deering |
| 8,798,332 B2 | 8/2014 | Otis |
| 8,827,445 B1 | 9/2014 | Wiser |
| 8,870,370 B1 | 10/2014 | Otis |
| 8,874,182 B2 | 10/2014 | Etzkorn |
| 8,890,946 B2 | 11/2014 | Publicover |
| 8,911,087 B2 | 12/2014 | Publicover |
| 8,960,898 B1 | 2/2015 | Etzkorn |
| 8,964,298 B2 | 2/2015 | Haddick |
| 8,971,978 B2 | 3/2015 | Ho |

(Continued)

FOREIGN PATENT DOCUMENTS

| | | |
|---|---|---|
| CN | 107092346 A | 8/2017 |
| WO | 2016195201 A1 | 12/2016 |
| WO | 2018109570 | 6/2018 |

OTHER PUBLICATIONS

Christiansen et al., editors. Motion Sensors Explainer. W3C Working Group Note, Aug. 30, 2017. retrieved from [https://www.w3.org/TR/motion-sensors/] on [Oct. 21, 2021]. (Year: 2017).

(Continued)

*Primary Examiner* — Antonio Xavier
(74) *Attorney, Agent, or Firm* — North Weber & Baugh LLP; Michael North

(57) ABSTRACT

Systems and methods for activating a button within a display are described. Embodiments of the invention provide a multi-step activation process using user eye movement within the display. The multi-step activation process comprises displaying an confirmation element in response to a first user gaze at a button. The button is subsequently activated in response to a second user gaze at the confirmation element.

9 Claims, 15 Drawing Sheets

Step 1
User Gaze
at Button within
AR/VR Field of View

Step 2
Confirmation Element
Appears
(Various Examples)

Step 3
User Performs Action
with Gaze at
Confirmation Element

Multi-step Button Activation

(56) References Cited

U.S. PATENT DOCUMENTS

| | | |
|---|---|---|
| 8,989,834 B2 | 3/2015 | Ho |
| 9,028,068 B2 | 5/2015 | Chang |
| 9,047,512 B2 | 6/2015 | Otis |
| 9,052,533 B2 | 6/2015 | Pugh |
| 9,153,074 B2 | 10/2015 | Zhou |
| 9,170,646 B2 | 10/2015 | Toner |
| 9,196,094 B2 | 11/2015 | Ur |
| 9,215,293 B2 | 12/2015 | Miller |
| 9,298,002 B2 | 3/2016 | Border |
| 9,298,020 B1 | 3/2016 | Etzkorn |
| 9,341,843 B2 | 5/2016 | Border |
| 9,390,326 B2 | 7/2016 | Publicover |
| 9,405,365 B2 | 8/2016 | Publicover |
| 9,600,069 B2 | 3/2017 | Publicover |
| 9,870,060 B2 | 1/2018 | Marggraff |
| 10,025,379 B2 | 7/2018 | Drake |
| 10,178,367 B2 | 1/2019 | Zhou |
| 10,345,621 B2 | 7/2019 | Franklin |
| 10,353,463 B2 | 7/2019 | Shtukater |
| 10,901,505 B1* | 1/2021 | Haine ................. G06F 3/04815 |
| 11,416,072 B1* | 8/2022 | Singh ..................... G06F 3/017 |
| 2004/0155907 A1 | 8/2004 | Yamaguchi |
| 2009/0066722 A1 | 3/2009 | Kriger |
| 2010/0231504 A1* | 9/2010 | Bloem .................... G06F 3/013 |
| | | 382/103 |
| 2011/0221659 A1 | 9/2011 | King, III |
| 2013/0145304 A1* | 6/2013 | DeLuca ................. G06F 3/013 |
| | | 715/781 |
| 2014/0063054 A1 | 3/2014 | Osterhout |
| 2014/0098226 A1 | 4/2014 | Pletcher |
| 2014/0168056 A1* | 6/2014 | Swaminathan ....... G06F 3/0481 |
| | | 345/156 |
| 2014/0198128 A1 | 7/2014 | Hong |
| 2014/0347265 A1 | 11/2014 | Aimone |
| 2014/0354539 A1* | 12/2014 | Skogo .................... G06F 3/013 |
| | | 345/156 |
| 2015/0143234 A1* | 5/2015 | Norris, III ............. G06F 3/013 |
| | | 715/256 |
| 2015/0192992 A1 | 7/2015 | Di Censo |
| 2015/0205106 A1 | 7/2015 | Norden |
| 2015/0212576 A1* | 7/2015 | Ambrus ................ G06F 3/0482 |
| | | 345/156 |
| 2015/0235439 A1 | 8/2015 | Schowengerdt |
| 2015/0235440 A1 | 8/2015 | Schowengerdt |
| 2015/0235444 A1 | 8/2015 | Schowengerdt |
| 2015/0235446 A1 | 8/2015 | Schowengerdt |
| 2015/0235457 A1 | 8/2015 | Schowengerdt |
| 2015/0235468 A1 | 8/2015 | Schowengerdt |
| 2015/0235471 A1 | 8/2015 | Schowengerdt |
| 2015/0241698 A1 | 8/2015 | Schowengerdt |
| 2015/0243090 A1 | 8/2015 | Schowengerdt |
| 2015/0338915 A1* | 11/2015 | Publicover ........... G06V 40/197 |
| | | 345/633 |
| 2015/0339857 A1 | 11/2015 | O'Connor |
| 2015/0348550 A1* | 12/2015 | Zhang ..................... G06F 3/167 |
| | | 704/235 |
| 2015/0362749 A1 | 12/2015 | Biederman |
| 2015/0362753 A1 | 12/2015 | Pletcher |
| 2016/0011419 A1 | 1/2016 | Gao |
| 2016/0018650 A1 | 1/2016 | Haddick |
| 2016/0018651 A1 | 1/2016 | Haddick |
| 2016/0018652 A1 | 1/2016 | Haddick |
| 2016/0018653 A1 | 1/2016 | Haddick |
| 2016/0025981 A1 | 1/2016 | Burns |
| 2016/0091737 A1 | 3/2016 | Kim |
| 2016/0133201 A1 | 5/2016 | Border |
| 2016/0195924 A1* | 7/2016 | Weber .................... G06F 3/013 |
| | | 345/156 |
| 2016/0253831 A1 | 9/2016 | Schwarz |
| 2016/0274660 A1 | 9/2016 | Publicover |
| 2016/0283595 A1 | 9/2016 | Folkens |
| 2017/0019661 A1 | 1/2017 | Deering |
| 2017/0023793 A1 | 1/2017 | Shtukater |
| 2017/0115742 A1 | 4/2017 | Xing |
| 2017/0123492 A1 | 5/2017 | Marggraff |
| 2017/0131764 A1* | 5/2017 | Bognar ................. G06F 3/0481 |
| 2017/0177078 A1 | 6/2017 | Henderek |
| 2017/0270636 A1 | 9/2017 | Shtukater |
| 2017/0285742 A1 | 10/2017 | Marggraff |
| 2017/0371184 A1 | 12/2017 | Shtukater |
| 2018/0120568 A1 | 5/2018 | Miller |
| 2018/0149884 A1 | 5/2018 | Miller |
| 2018/0180980 A1* | 6/2018 | Ouderkirk ................ G02B 5/04 |
| 2018/0275753 A1 | 9/2018 | Publicover |
| 2018/0335835 A1 | 11/2018 | Lemoff |
| 2018/0348969 A1 | 12/2018 | Kawamura |
| 2019/0056785 A1 | 2/2019 | Suk |
| 2019/0235624 A1 | 8/2019 | Goldberg |
| 2019/0250408 A1 | 8/2019 | Lafon |
| 2019/0250432 A1 | 8/2019 | Kim |
| 2019/0377428 A1 | 12/2019 | Mirjalili |
| 2019/0390976 A1 | 12/2019 | Anderson |
| 2021/0208674 A1 | 7/2021 | Haine |
| 2022/0121344 A1* | 4/2022 | Pastrana Vicente ........................ |
| | | G06F 3/04815 |

OTHER PUBLICATIONS

CN107092346A English translation (Year: 2017).
International Search Report and Written Opinion in PCT/US2020/056376, dated Jan. 12, 2021, 10 pages.
WO2016195201A1 English translation (Year: 2016).
International Search Report and Written Opinion in PCT/US2020/048091, dated Dec. 16, 2022, 10 pages.

\* cited by examiner

Visual Association between Button and Confirmation Element

Defining Location of Confirmation Element

Exemplary Eye-controlled Button Interaction

Slider Style Eye-controlled Button Interaction

Spike Style Eye-controlled Button Interaction

Enhanced Exemplary Eye-controlled Button Interaction

Enhanced Button Bar

Virtual Response Block with Enhanced Buttons

Button Dismissal

Enhanced Button Dismissal

BUTTON ACTIVATION WITHIN AN EYE-CONTROLLED USER INTERFACE

TECHNICAL FIELD

The present disclosure generally relates to systems and methods for eye-controlled user interfaces, and more particularly, to multi-step activation processes of buttons based on user gaze fixation within a display such as an augmented reality ("AR") or virtual reality ("VR") display.

BACKGROUND

The growth of AR/VR technologies across a large and diverse set of markets is well understood by one of skill in the art. Markets such as gaming, media, search, and information management implement a variety of different AR/VR products to allow an individual to interact within a virtual environment. These AR/VR products provide an individual a rich and dynamic platform in which the user can retrieve information, view media content, navigate virtual scenes and interact with other types of content in a manner unique to the AR/VR environment. It is important that these AR/VR products maintain a user-friendly experience throughout their use and provide a user the ability to interact with virtual content in a simple and consistently accurate manner.

AR/VR technologies are oftentimes constrained by the way an individual can interact with the virtual environment. Some AR/VR products implement an eye-controlled user interface where a user interacts with virtual content using eye movement. This interface may rely exclusively on eye-controlled interactions or may use a combination of eye-controlled interactions with other types of user control such as hand-gestures, hand controllers, head movement or other types of movement that is translated into the virtual environment. Eye-controlled user interfaces, especially those that rely exclusively on eye movement, are limited to a small subset of ways in which a user can interact with virtual content and present unique challenges in providing a robust and reliable interface. One such issue with eye-controlled user interfaces is ensuring consistently accurate activation of buttons based on user eye movement within the display.

DETAILED DESCRIPTION OF EMBODIMENTS

Figure 1:
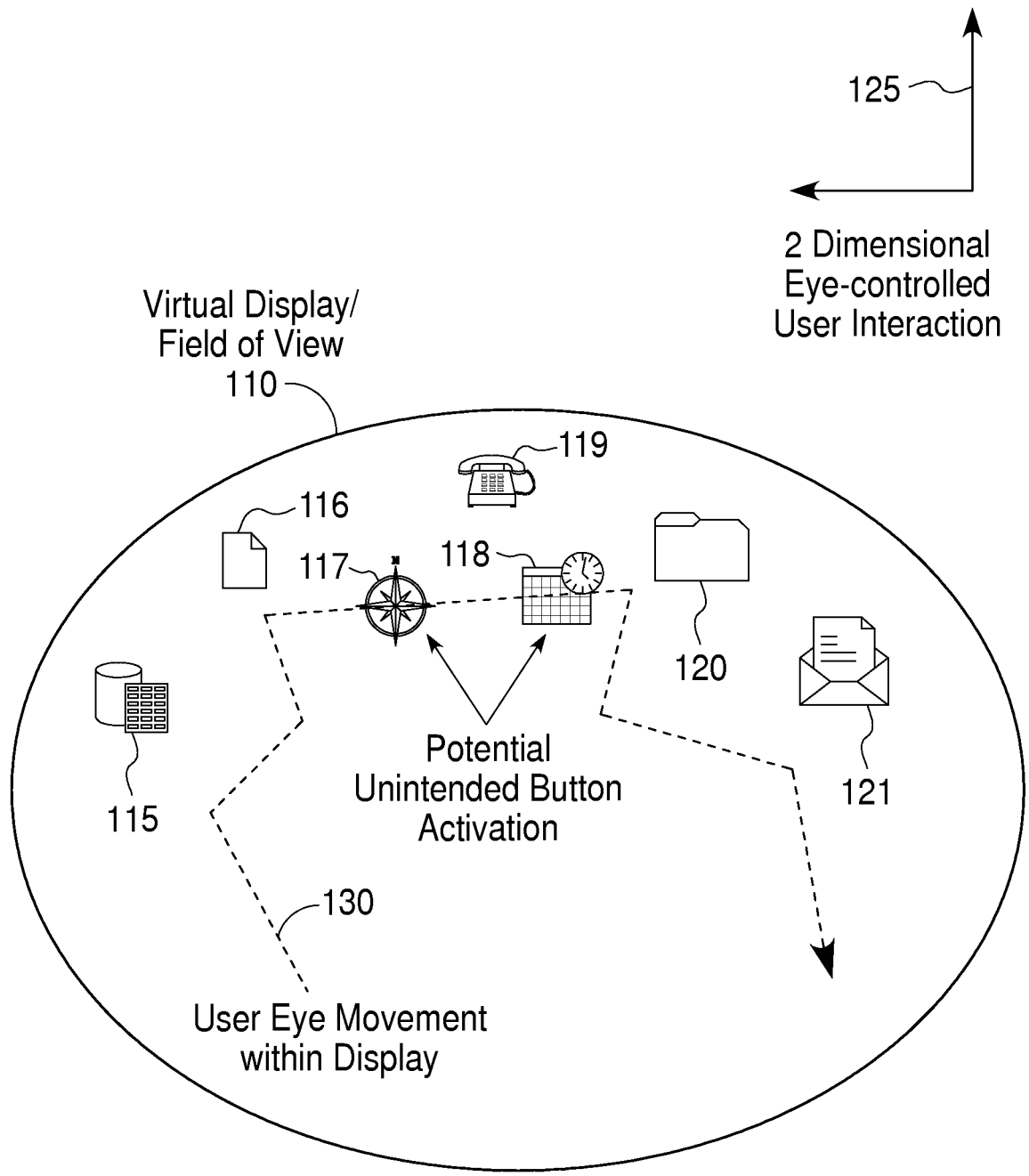
FIG. 1 illustrates a display illustrating potential false activation of buttons caused by user eye movement.

The figures and the following description relate to various embodiments by way of illustration. It is noted that from the following discussion, alternative embodiments of the structures and methods disclosed herein will be readily recognized as viable by one of skill in the art. It is further noted that any headings used herein are only for organizational purposes and shall not be used to limit the scope of the description or the claims. All documents cited are incorporated by reference herein in their entirety.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

One skilled in the art shall recognize that: (1) certain steps may optionally be performed; (2) steps may not be limited to the specific order set forth herein; (3) certain steps may be performed in different orders; and (4) certain steps may be done concurrently.

For purposes of this disclosure, the term "button" is defined as a symbol within a display that can be activated by a user's gaze, examples of which include (but are not limited to) icons, shapes, text, glyphs, links, menus and menu components, pointers, etc. The term "confirmation element" is defined as a symbol within the display that appears in response to a user gaze fixating at a button. The confirmation element is associated with the button and provides confirmation of a user's intent to activate the button. The term "gaze" is defined as a user looking at a location within the display. The term "fixate" is defined as a period of time of a user gaze. The period of time during which a user fixates at a location may be measured in relation to a threshold. This threshold may be static or vary based on factors such as user history, user activity, machine learning processes, saccade prediction or other factors that adjust this threshold. The time may be measured as an incremental counter or a countdown time.

Embodiments of the present invention implement an eye-controlled user interface in which buttons are activated using a multi-step activation process. Eye-controlled user interfaces track a user's eye movement and map the movement within a virtual environment. In one example, AR/VR goggles have an inward-facing camera that monitors user eye movement as he/she is viewing a display. The goggles correlate this eye movement to the virtual content being viewed to allow interaction between the user and the display. In another example, contact lenses are worn by a user and track the movement of the user's eyes. This eye movement is correlated to a display projected onto the user's eye from a projector(s) embedded in the contact lens, examples of which may be found in U.S. patent application Ser. No. 16/940,152, filed on Jul. 27, 2020, entitled "Eye-Tracking User Interface for Virtual Tool Control," listing inventors Haine et al.; U.S. patent application Ser. No. 16/005,379, filed on Jun. 11, 2018, entitled "Contact lens gaze tracking architectures," listing inventors Mirjalili et al.; and U.S. patent application Ser. No. 16/200,039, filed on Nov. 26, 2018, entitled "Eye-mounted Displays Including Embedded Solenoids," listing inventors Mirjalili et al., which patent documents are incorporated by reference herein in their entirety and for all purposes.

Eye-controlled user interfaces (either exclusively or partially controlled by eye movement) present unique challenges in defining how buttons are activated within a display. One such challenge is defining the user's intent within the display when he/she looks at a button. The system should be able to differentiate between when a user looked at a button to activate it and when the user viewed the button without intending to activate it.

FIG. 1 illustrates an aspect of unintended activation of buttons within a display. As shown, an exemplary display is provided and defined as a field of view 110 within an AR/VR environment. The field of view 110 includes a variety of different eye-controlled buttons 115-121 that allow the user to interact with the display. The user's eye movement is tracked within a two-dimensional space 125 and mapped in the field of view to allow the system to respond to eye movement and manage virtual content.

Accurate activation of buttons within the field of view 110 is challenging if the system relies on a user looking at a button to activate it. Correlating a user's intent to activate a button versus a user perusing content in the display is essential to a user interface that relies on eye movement as a primary means for user input. As a user views the display, his/her eyes may look at one or more of the buttons within the display for a short period of time without intending to activate a button. For example, a user's eyes may simply traverse 130 across the field of view 110 to view content displayed within virtual environment. This eye movement is mapped into the display and may cross any number of buttons 117, 118. If these buttons are activated, the display may become unmanageable as buttons are unintentionally activated. Various embodiments of the invention address this problem by defining button activation processes that more accurately predict the intent of a user to activate a particular button.

Figure 2:
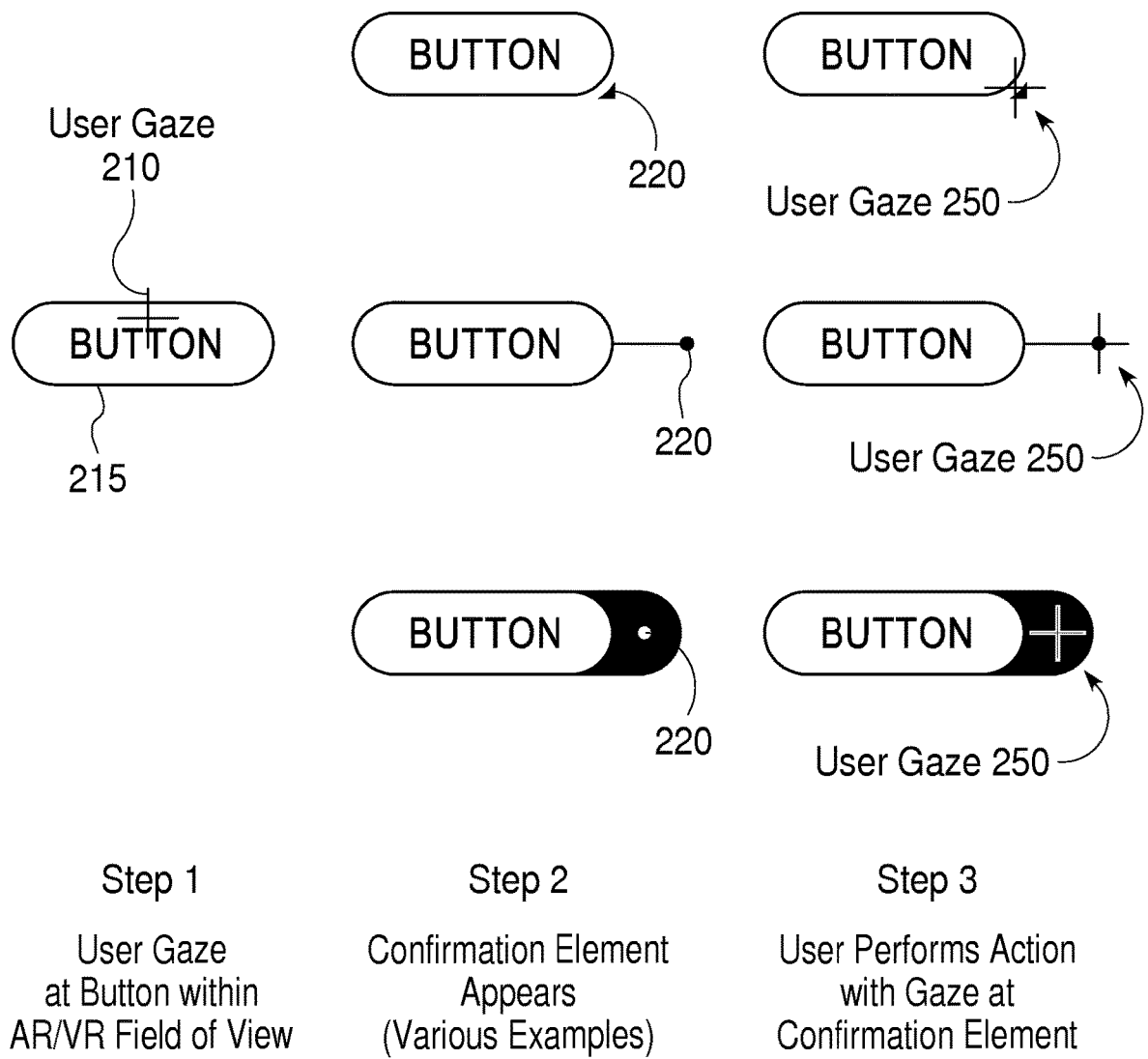
FIG. 2 illustrates an exemplary multi-step button activation process according to various embodiments of the present disclosure.

FIG. 2 illustrates exemplary eye-controlled, multi-step button authentication processes according to various embodiments of the invention. A three-step activation process is illustrated that allows a user to activate a button 215 with eye movement. A user fixates a first gaze 210 at a location associated with the button 215. This location may be within the borders of the button 215, at an edge of the button 215, or within a predefined distance external to the edge of the button 215. This location may account for variations within the user's gaze such a jitter or drift as the user is looking at the location. In response to the first gaze fixation 210, a confirmation element 220 is generated within the display, three examples of which are illustrated herein.

The confirmation element 220 is generated within the display in a manner to visually show an association with the button 215 to the user. In a first example, the confirmation element 220 is a triangle placed at an edge of the button. In a second example, the confirmation element 220 is a spike coupled to the button. In a third example, the confirmation element 220 is a virtual slider of the button. The shape, location, shade and/or color of the confirmation element may vary based on design implementations. The three confirmation elements are described in more detail later in this description.

The user fixates a second gaze 250 at the confirmation element to activate the button. This second gaze 250 may be at a location within the confirmation element, at an edge or point of the confirmation element 250 or within a predefined distance external to the confirmation element 250. The length of time of the second gaze fixation 250 may be equal to or different from the first gaze 210. After performing the second gaze fixation 250 at the confirmation element 220, the corresponding button is activated. This multi-step activation process of a button reduces unintended activation of buttons based on user eye movement over prior art systems.

Figure 3:
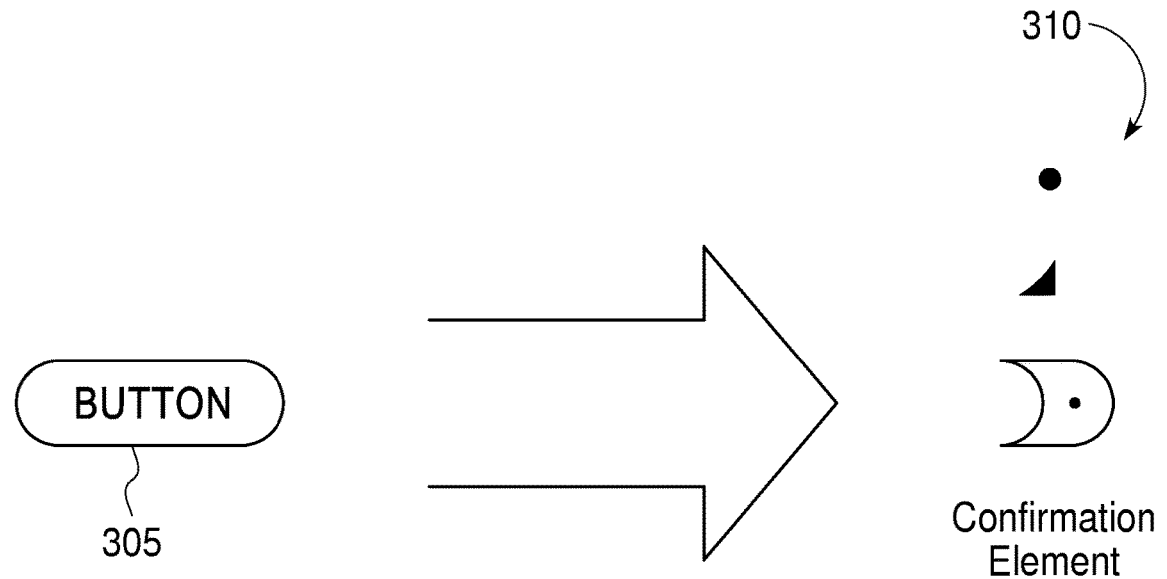
FIG. 3 show examples of a button and corresponding confirmation elements according to various embodiments of the present disclosure.
Figure 3:
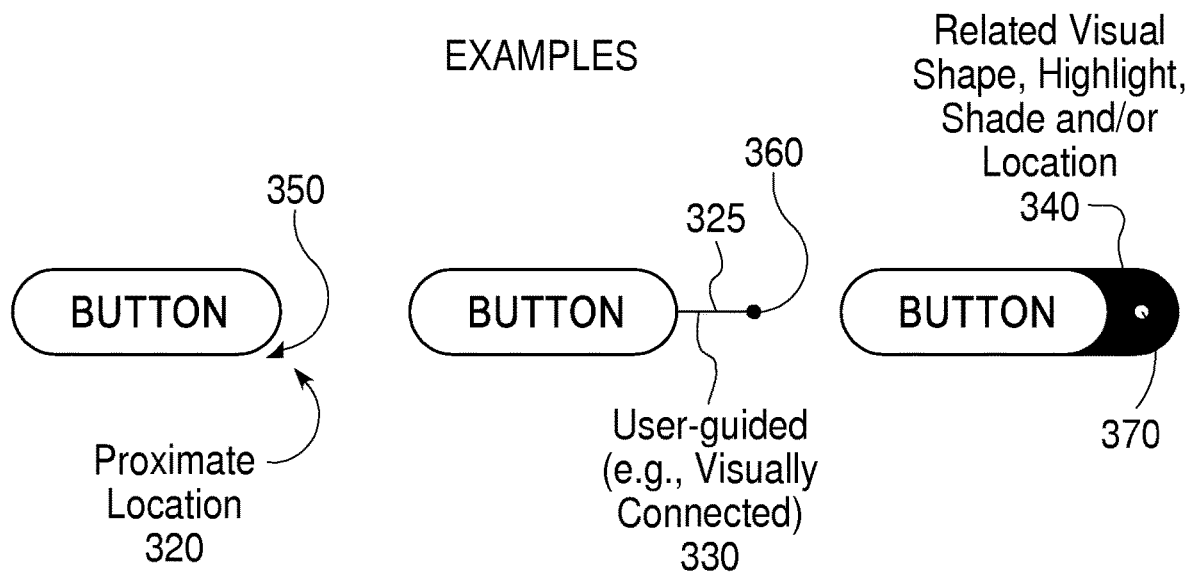

FIG. 3 illustrates representative visual relationships between a button and confirmation element according to various embodiments of the invention. As previously stated, the confirmation element 310 is displayed so that a user viewing the control will associate it with the button 305. There are a variety of confirmation element display characteristics that show this association to the button 305.

A first characteristic is a confirmation element location 320 relative to the button 305. In one example, the confirmation element 350 is positioned at a border of the button 305. If the confirmation element 350 appears after a user gaze fixates at the button 305, the appearance of the confirmation element 350 within the visual area at which the user is gazing will indicate an association with the button 305. Accordingly, one skilled in the art will recognize that a confirmation element 350 may be positioned within a button, at an edge or border of a button, or within a distance proximate to the button such that a user will see the confirmation element when it is initiated.

A second characteristic is a user-guided confirmation element 330. In another example, the confirmation element 360 is visually coupled to the button 305 such that the user will recognize the association between button and confirmation element. This visual coupling may be implemented a number of different ways within a display such as a line 325 connecting the button 305 to the confirmation element 360. The coupled confirmation element 360 may be positioned at a variety of locations external to the button 305.

Other characteristics such as related visual shapes, border highlights, shading, etc. 340 may also be used to visually associated a confirmation element with a button. In yet another example, a slider confirmation element 370 is visually displayed proximate to the button 305. This slider 370 may be shaded or have a different color. It may also have a similar shape to the button or appear to extend the button once activated. Other confirmation element characteristics may also be used to visually associate a button with a confirmation element.

Figure 4:
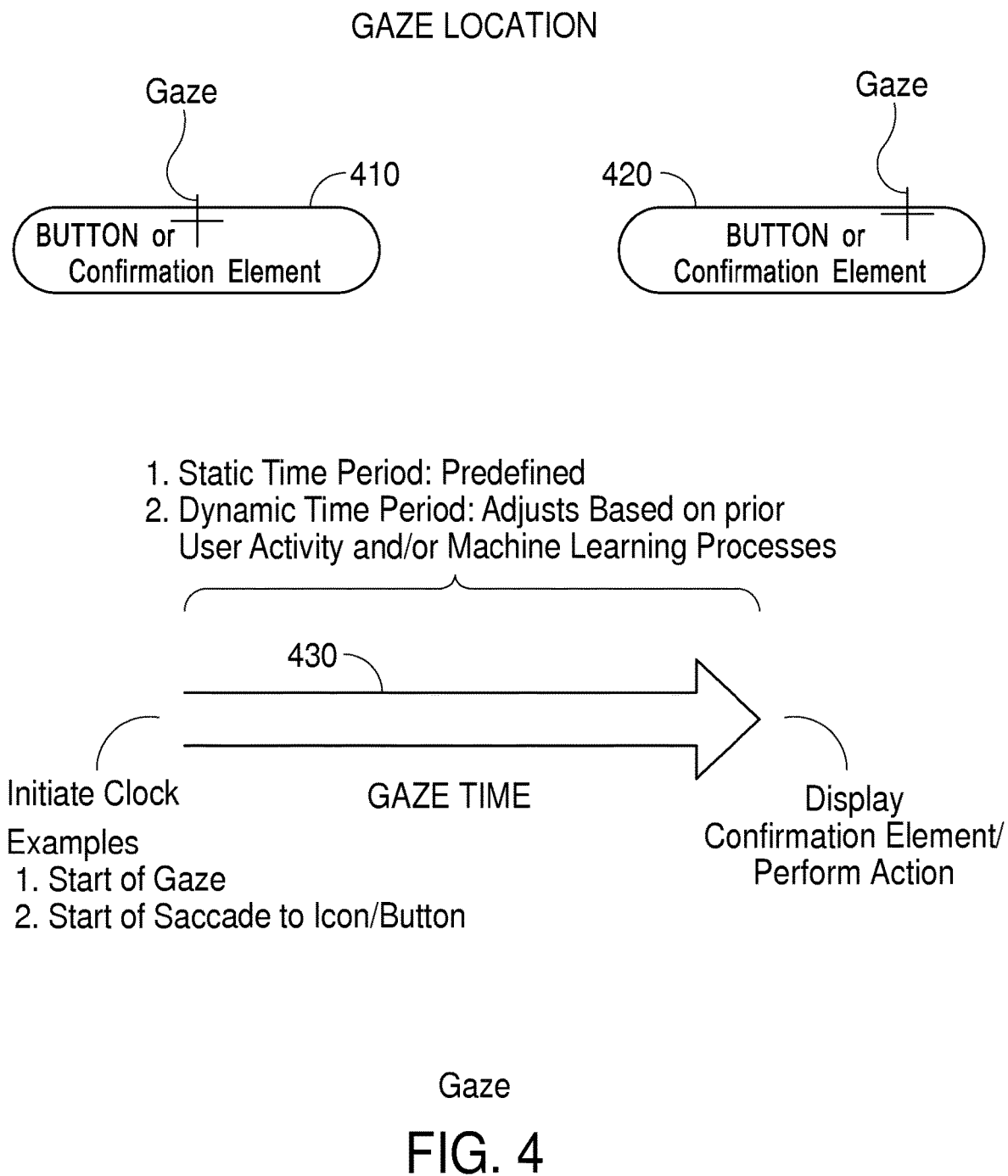
FIG. 4 highlights gaze characteristics of location and time according to various embodiments of the present disclosure.

FIG. 4 illustrates location and fixation time characteristics of a user gaze according to various embodiments of the invention. A user gaze occurs when a user fixates at a location within a display for a time equal to or exceeding a threshold. For purposes of triggering the display of a confirmation element or activating a button, the user gaze may appear within a button/confirmation element 410, at an edge or line of a button/confirmation element 420 or outside of a button/confirmation element at a set distance. A threshold of time 430 is applied to the gaze fixation at the location. Once the time threshold 430 is reached, the system generates a response to the gaze fixation. This time threshold 430 may be a static period of time or may change based on a variety of factors such as the user's prior activity, machine learning processes that predict a user's likelihood of intending an activation process, the frequency a button has been activated, etc. This time may be measured by a clock or counter that increments forward or a clock that countdowns from a first value to zero. The clock may be initiated using a variety of factors such as when a user gaze begins looking at a particular location, when a user starts to saccade to a particular location, etc.

Figure 5:
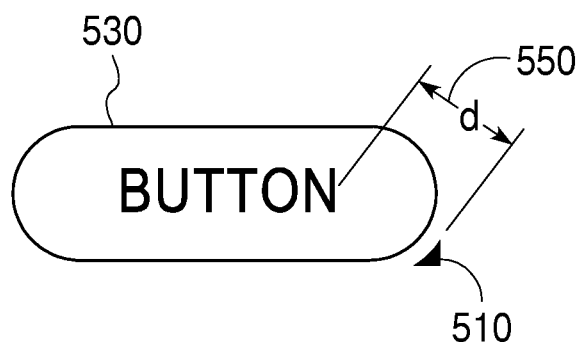
FIG. 5 illustrates various distance characteristics of confirmation elements to buttons according to various embodiments of the present disclosure.
Figure 5:
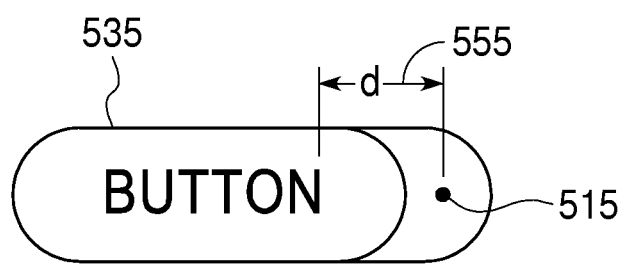
Figure 5:
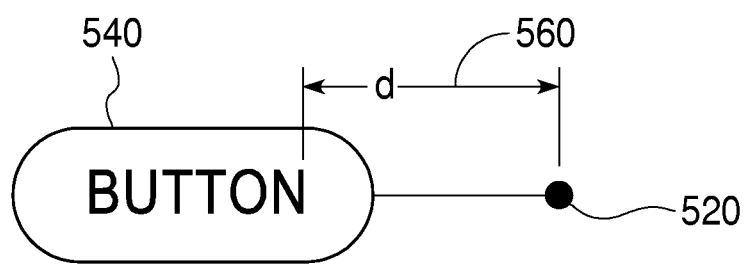

FIG. 5 provides examples of location distances between a button and a confirmation element according to various embodiments of the invention. In each example, a confirmation element 510, 515, 520 is positioned proximate to its corresponding button 530, 535, 540. The location of a confirmation element may be defined at a distance 550, 555, 560 that allows a user to associate a confirmation element with a corresponding button. For purposes of this disclosure, the distance should be small enough so that the confirmation element appears within the user's field of view after a user gaze fixates at the button for a certain period of time. Specifically, the user should not be required to scroll beyond the field of view to subsequently gaze at the confirmation element. As previously mentioned, the confirmation element may be displayed such that an association to the button is apparent to the user such as placing the confirmation element 510 on an edge of the button, placing the confirmation element 515 within an extension of the button or placing the confirmation element 520 at the end of a line coupled to the button.

Figure 6:
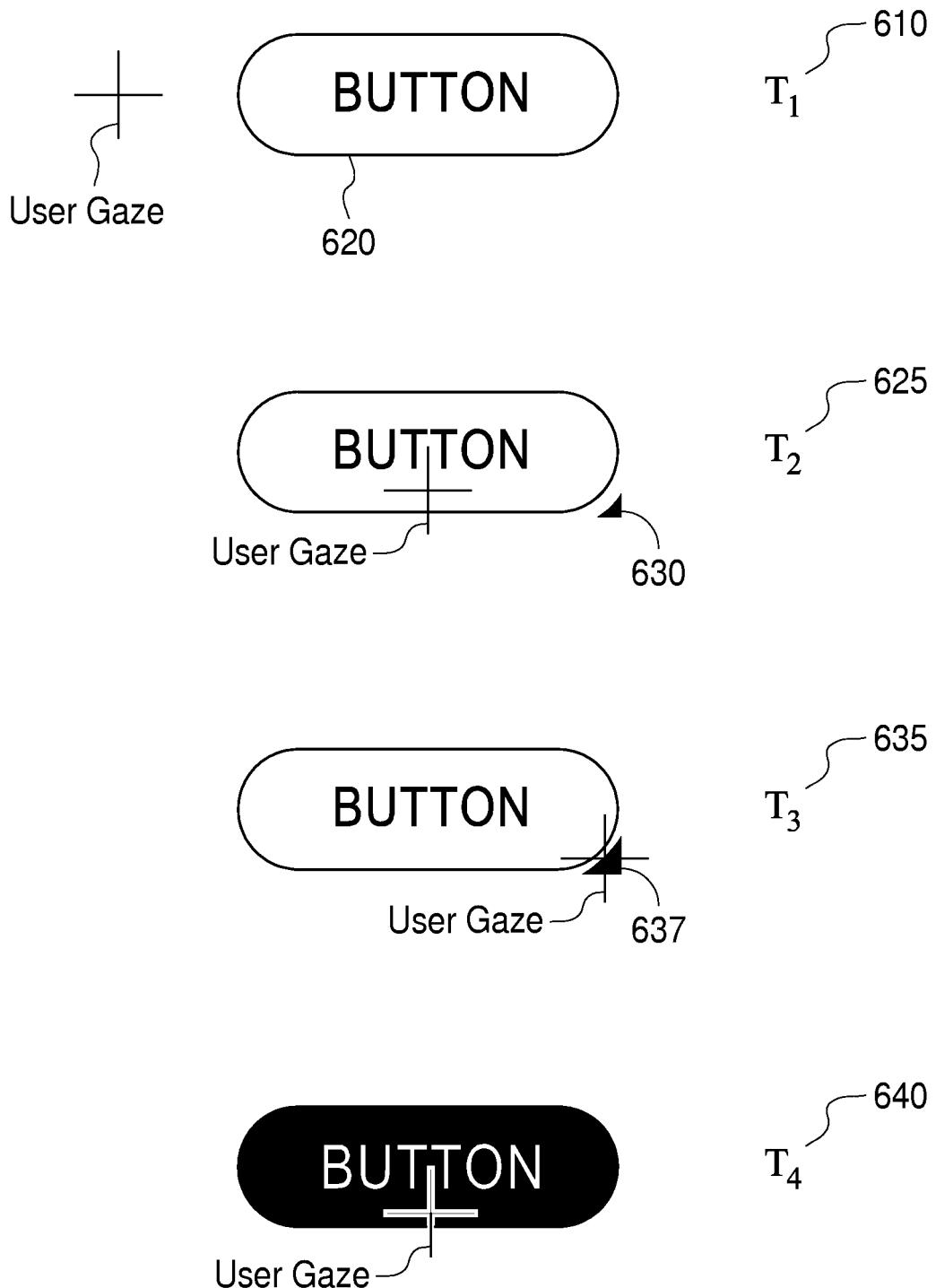
FIG. 6 illustrates an exemplary multi-step button activation process with drop-down confirmation element according to various embodiments of the present disclosure.

FIG. 6 illustrates a first implementation of a multi-step button activation using eye movement according to various embodiments of the invention. At a first period of time T$_1$ 610, a button 620 is visible within a display and a user is looking away from the button 620. At a second period of time T$_2$ 625, a user gaze fixates at the button resulting in a confirmation element 630 appearing proximate to a lower edge of the button 620. At a third period of time T$_3$ 635, the user gaze fixates at the confirmation element 630. In certain embodiments, the confirmation element size increases 637 at the beginning of the user gaze. At a fourth period of time T$_4$ 640, the button 620 is activated and the user can interact with the activated button or any content associated with the activated button. In some examples, the confirmation element 630 disappears after the button 620 is activated. In other examples, the confirmation element 630 remains visible after the button 620 is activated and may provide further functionality such as deactivating the button 620 or deleting content displayed within the virtual environment.

Figure 7:
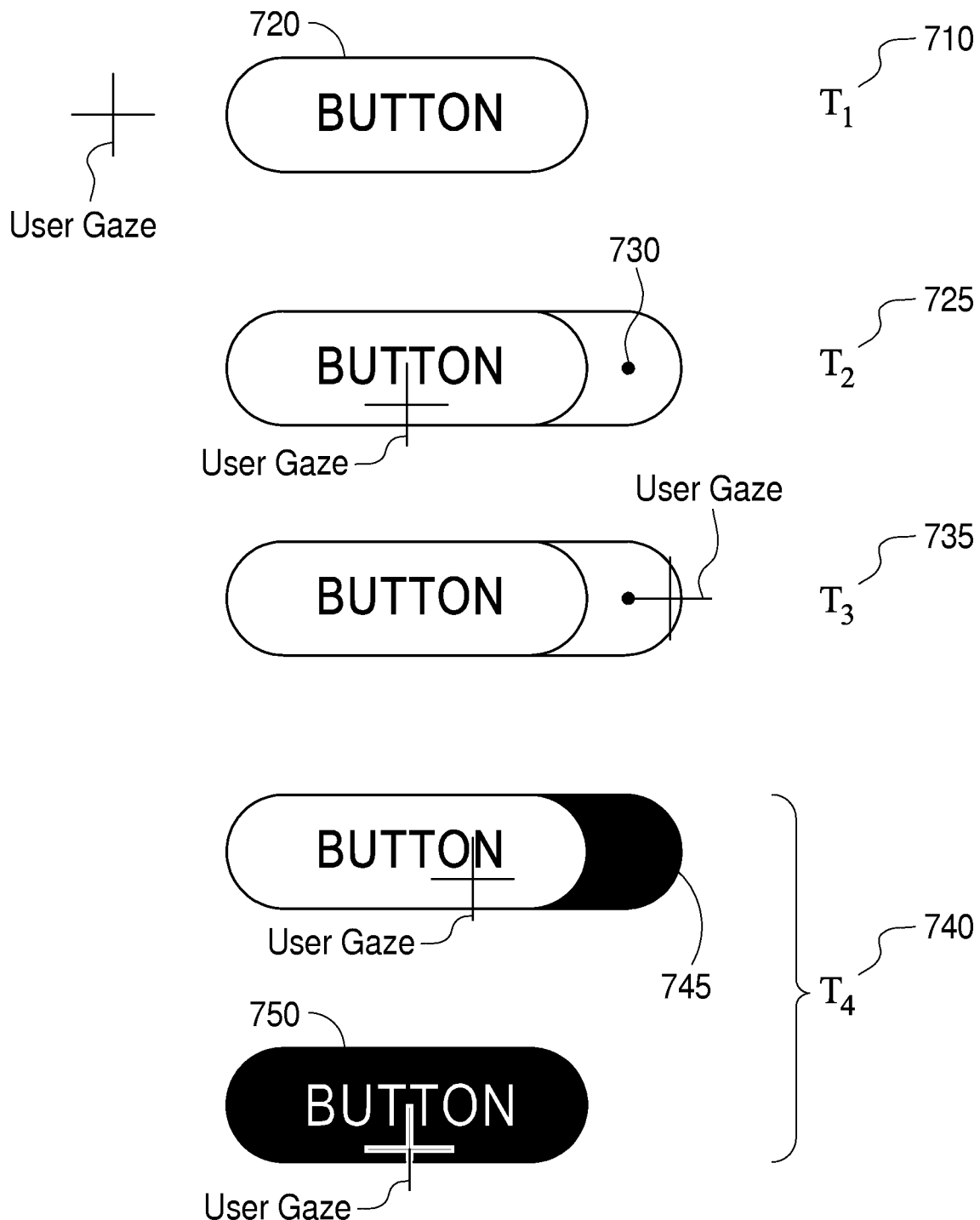
FIG. 7 illustrates an exemplary multi-step button activation process with slider confirmation element according to various embodiments of the present disclosure.

FIG. 7 illustrates a second implementation using a slider-style, multi-step button activation using eye movement according to various embodiments of the invention. At a first period of time T$_1$ 710, a button 720 is visible within a display and a user is looking away from the button 720. At a second period of time T$_2$ 725, the user gaze fixates at the button resulting in a confirmation element 730 appearing as a shaded slider adjacent to the button 720. At a third period of time T$_3$ 735, the user gaze fixates at the slider confirmation element 730. At a fourth period of time T$_4$ 740, the button 720 is activated and the user can interact with the activated button, or any content associated with the activated button. In certain examples, the slider confirmation element 730 changes color or shade 745 to indicate activation of the button 720 or the button 720 changes color or shade 750 to indicate activation.

Figure 8:
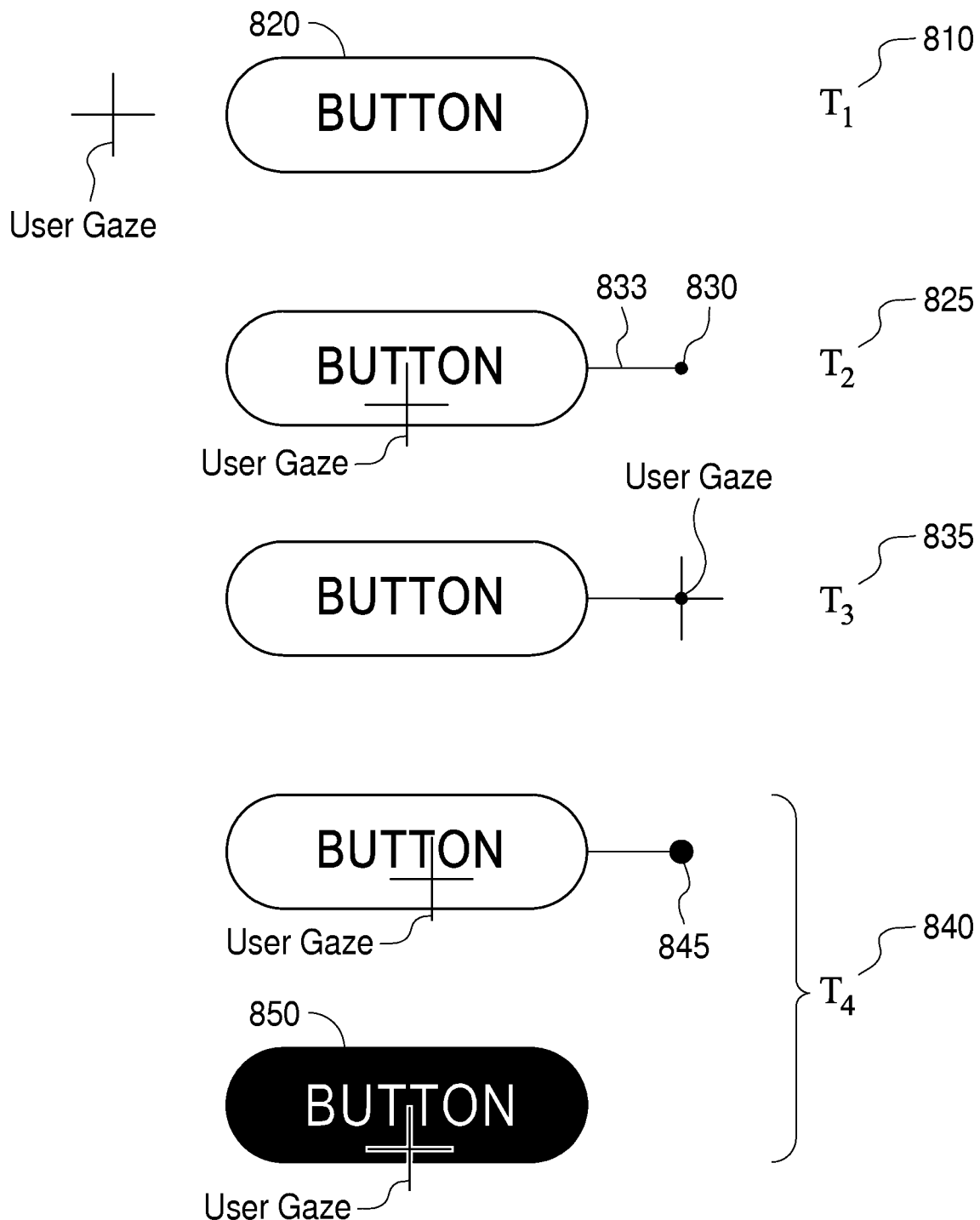
FIG. 8 illustrates an exemplary multi-step button activation process with spike-style confirmation element according to various embodiments of the present disclosure.

FIG. 8 illustrates a third implementation using a spike-style, multi-step button activation using eye movement according to various embodiments of the invention. At a first period of time T$_1$ 810, a button 820 is visible within a display and a user is looking away from the button 820. At a second period of time T$_2$ 825, the user gaze fixates at the button resulting in a confirmation element 830 appearing as an end-point spike coupled to the button 820 via line 833. At a third period of time T$_3$ 835, the user gaze fixates at the spike confirmation element 830. At a fourth period of time T$_4$ 840, the button 820 is activated and the user can interact with the activated button, or any content associated with the activated button. In certain examples, the spike confirmation element 830 changes color or shade 845 to indicate activation of the button 820 or the button 820 changes color or shade 850 to indicate activation.

Figure 9:
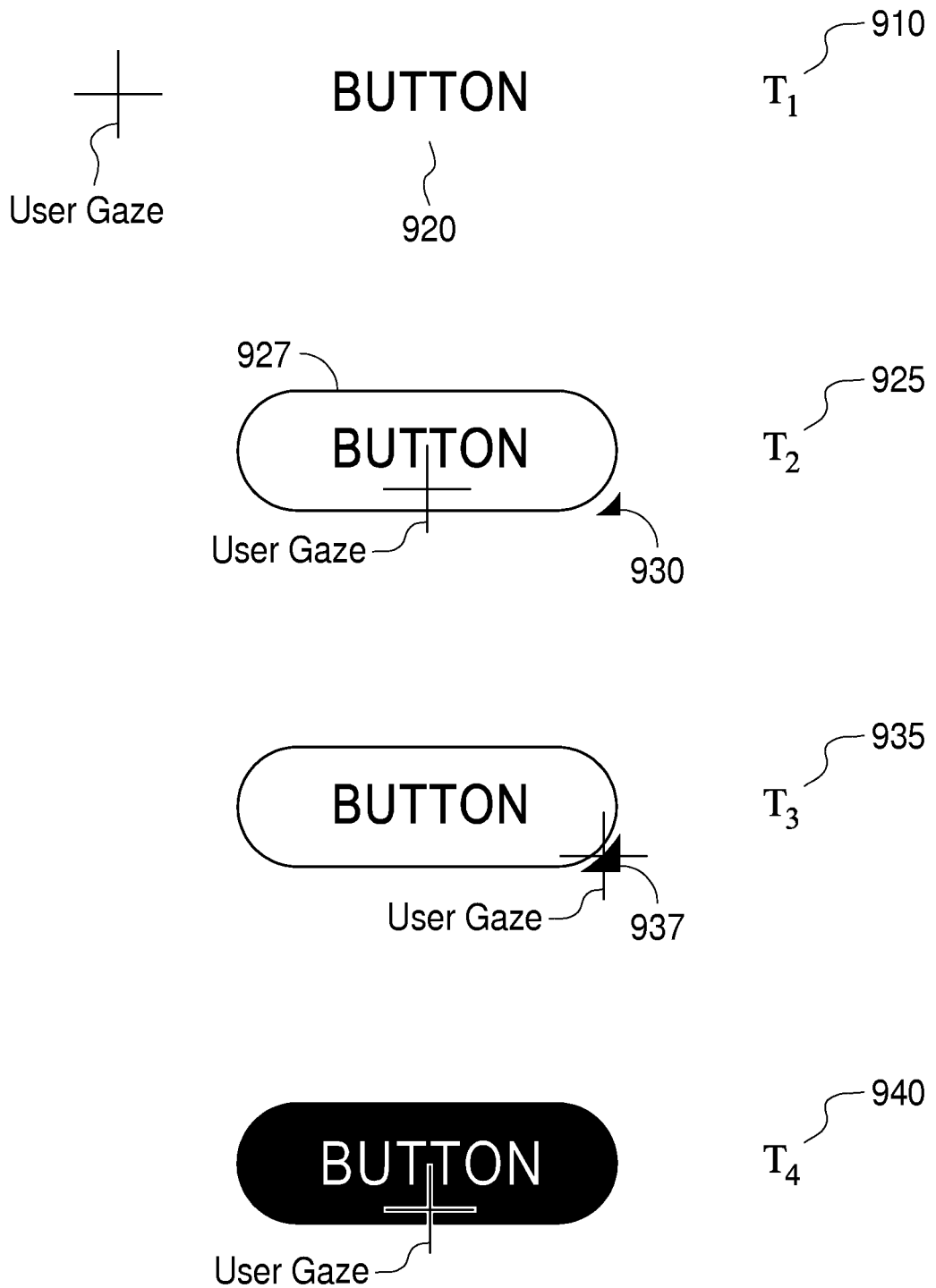
FIG. 9 illustrates an exemplary multi-step button activation process in which a button border is initiated by a user gaze according to embodiments of the present disclosure.

FIG. 9 illustrates a fourth implementation using an enhanced border, multi-step button activation using eye movement according to various embodiments of the invention. At a first period of time T$_1$ 910, at least a portion of button 920 is visible within a display and a user is looking away from the button 920. Portions of the button 920, such as the border of the button, may not be visible at this time for a variety of purposes including to reduce the button size shown within the display. At a second period of time T$_2$ 925, the user gaze fixates at the button resulting in a complete display of the button 927 and a confirmation element 930 appearing at an edge of the button 920. At a third period of time T$_3$ 935, the user gaze fixates at the confirmation element 930. In certain embodiments, the confirmation element may change shape or color, such as increase size 937, when this gaze begins. At a fourth period of time T$_4$ 940, the button 920 is activated and the user can interact with the activated button, or any content associated with the activated button.

This reduced button footprint allows the display to show more buttons in an organized and uncluttered manner. It also allows buttons to be positioned closer to each other within the display. Exemplary implementations of this enhanced border button are provided below.

Figure 10:
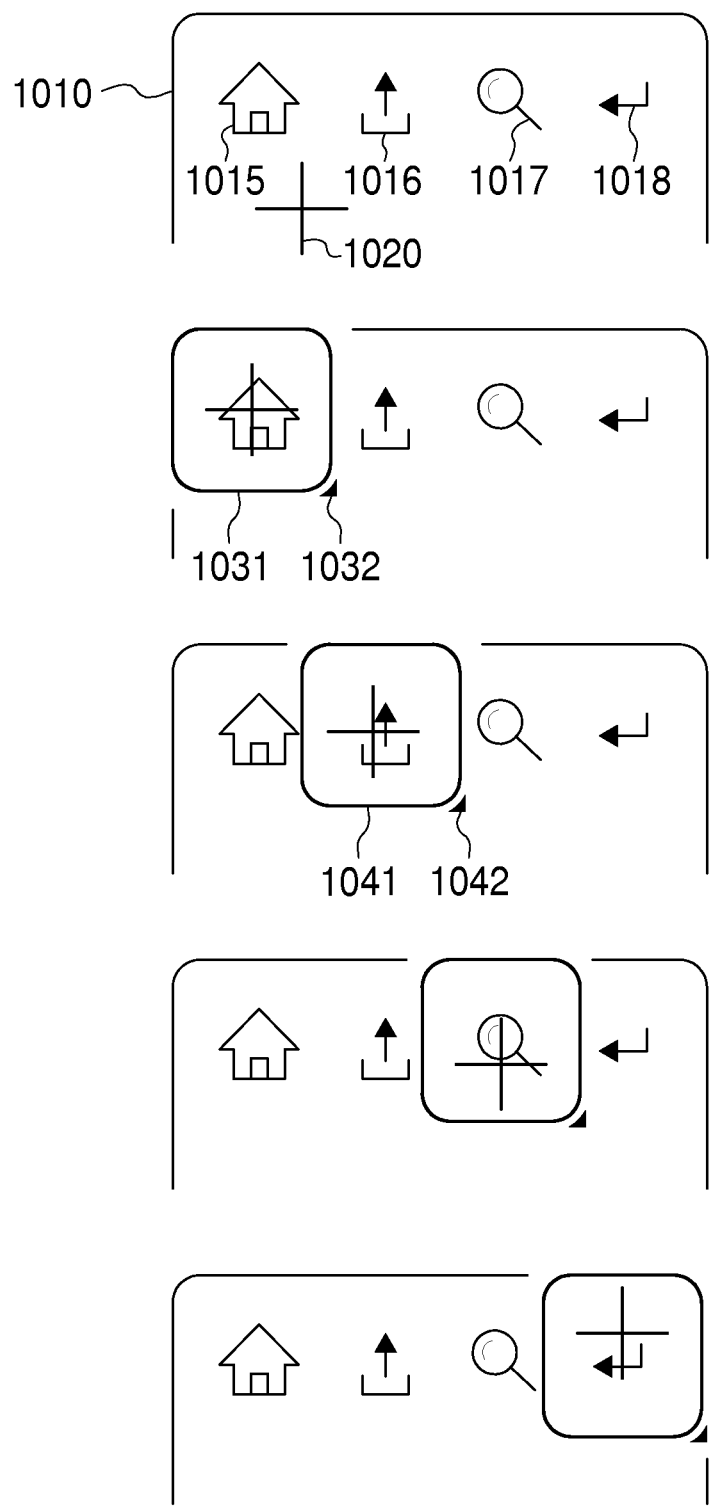
FIG. 10 illustrates an enhanced button bar according to embodiments of the present disclosure.

FIG. 10 illustrates a menu within a display having enhanced border multi-step activation according to various embodiments of the invention. A menu 1010 is shown having four icons 1015-1019. In this example, borders of the four buttons are not visible when a user is not looking 1020 at it. When the user fixates a first gaze at a first button 1015, a border 1031 appears around the button 1030 and a confirmation element 1032 is displayed. As previously mentioned, the button 1030 appearance may change in a variety of ways in response to a user gaze fixation; all of which fall within the scope of the invention.

This concept of enhanced button is shown across the other buttons in the menu. A second gaze fixation at a second button 1016 results in a border 1041 and confirmation element 1042 being displayed. The same process occurs at a third button 1017 and a fourth button 1018. Using these enhanced buttons allows the menu 1010 to have button located closer together and displayed in an organized manner. The buttons 1015-1019 may be activated by performing a subsequent gaze fixation at the confirmation element.

Figure 11A:
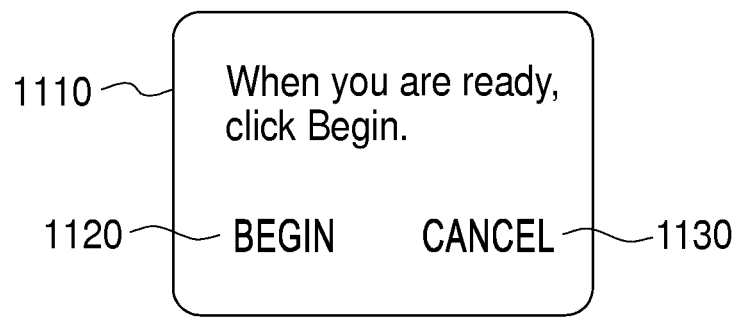
FIG. 11A illustrates virtual response block according to embodiments of the present disclosure.
Figure 11A:
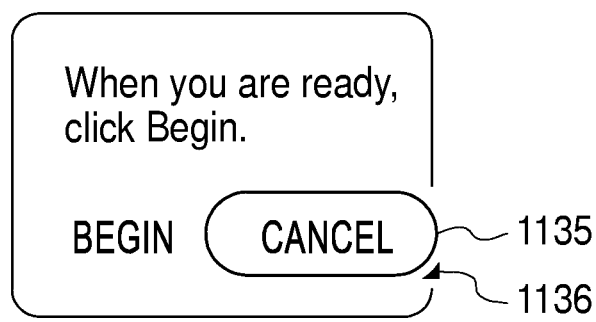
Figure 11A:
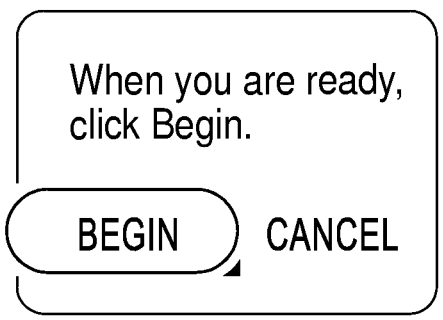
Figure 11A:
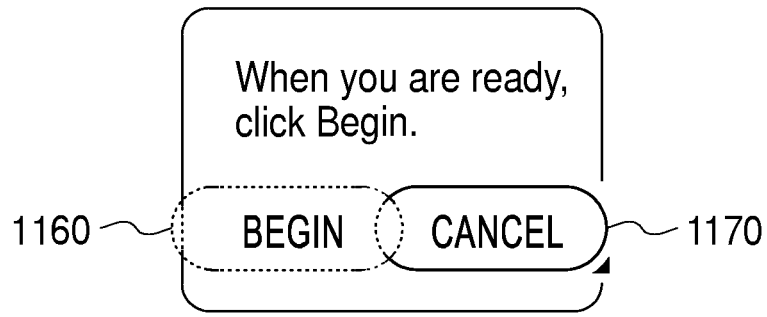

FIG. 11A shows an exemplary virtual response block comprising two buttons with enhanced confirmation elements according to various embodiments of the invention. The virtual response block 1110 allows a user to answer a question by selecting a BEGIN button 1120 or a CANCEL button 1130. The two buttons are located in close proximity to each other within the virtual response block 1110 and neither has a border until a user gaze occurs.

A user gaze fixates at the CANCEL button 1130 resulting in a border 1135 and confirmation element 1136 being displayed. In this instance, the enhanced button within the border extends beyond the virtual response block 1110 and is closer to/overlaps with the BEGIN button 1120. A multi-step activation of the CANCEL button 1130 occurs when the user fixates a subsequent gaze at the confirmation element 1136. A similar multi-step activation process occurs with the BEGIN button 1120.

For illustrative purposes, a version of the virtual response block 1110 is provided in which both a BEGIN button 1160 and a CANCEL button 1170 are shown with borders. If borders are shown for both buttons, overlap between buttons and borders with the virtual response block 1110. One skilled in the art will recognize a resulting more-efficient use of space within a display when enhanced buttons are used. A variety of different implementations of enhanced buttons may be used where a first portion of the button is only visible and a second portion of the button (e.g., border) appears when a user gaze fixation occurs.

Figure 11B:
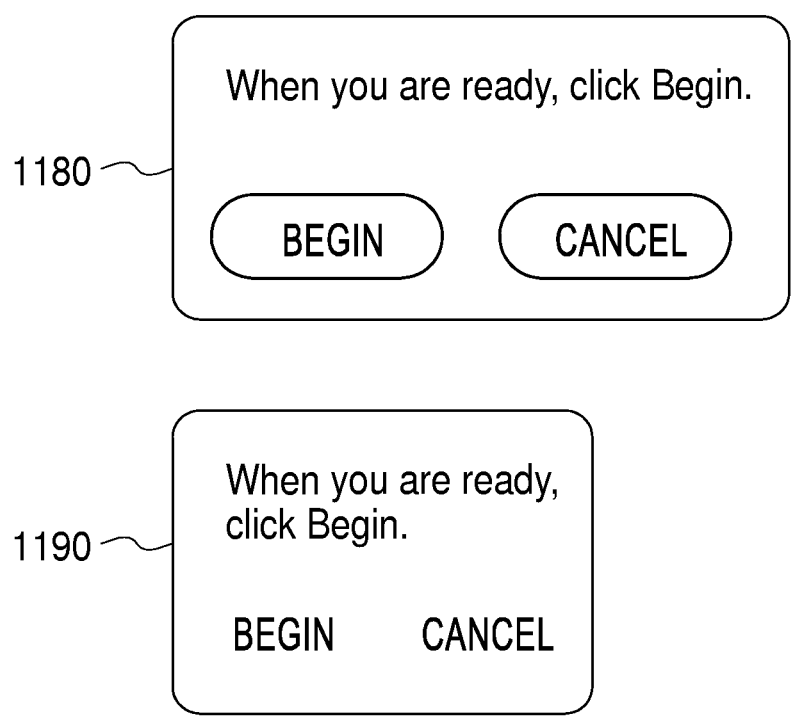
FIG. 11B illustrates virtual response blocks with and without enhanced buttons according to various embodiments of the invention.

FIG. 11B further illustrates the improved virtual footprint of enhanced buttons versus buttons within a response block according to various embodiments of the invention. A first version with button having borders is shown in a first block 1180. A second version with enhanced button is shown in a second block 1190. One skilled in the art will recognize the benefits of enhanced buttons including more efficient use of space, the improved ability to organize a display, etc.

Figure 12:
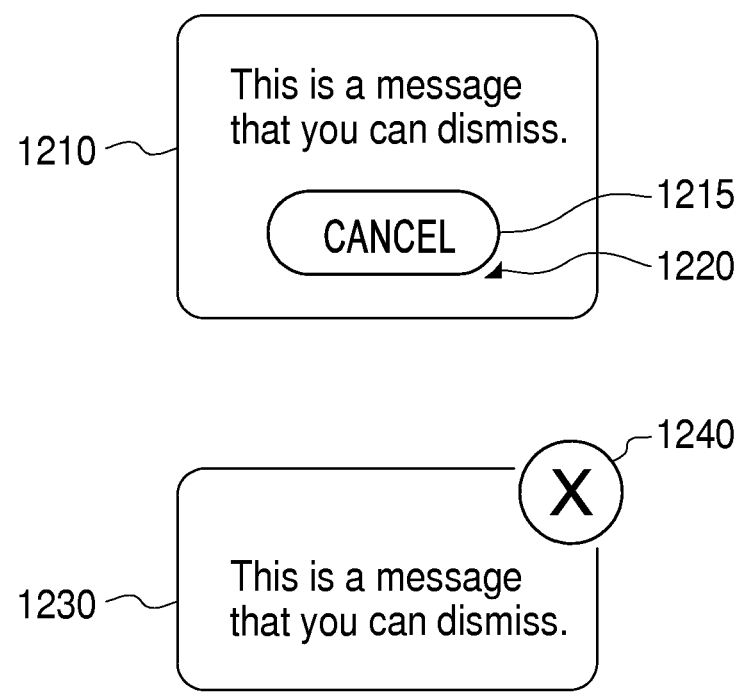
FIG. 12 illustrates exemplary button dismissals according to embodiments of the present disclosure.

FIG. 12 illustrates button dismissal using multi-step authentication according to various embodiments of the invention. A virtual dismissal block 1210 is shown with a CLOSE button 1215. In response to a user first gaze fixating proximate to the CLOSE button 1215, a confirmation element 1220 appears. A second gaze fixates proximate to the confirmation element 1220 results in the dismissal block 1210 disappearing. In addition, content associated with the dismissal block 1210 may also be removed and/or transformed in response to the activation of the dismissal.

As previously described, the confirmation element may be provided in a variety of locations and shapes. A second example of a confirmation element is shown where a glyph, such as an X, 1240 is provided at a corner of a dismissal block 1230. Embodiments of the invention may implement different enhancements to the confirmation element wherein it appears/disappears, changes size, changes shape or color, etc. to confirm a user's intent to activate or dismiss a button.

Figure 13:
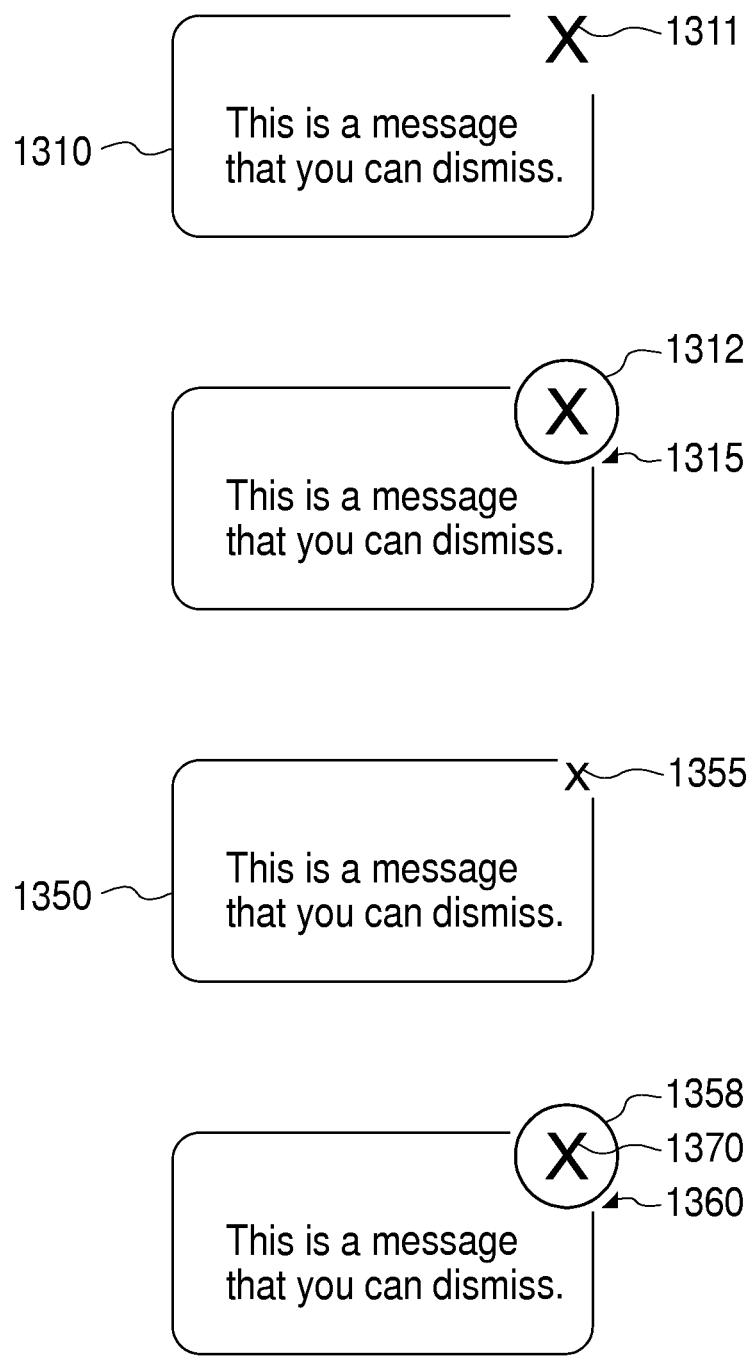
FIG. 13 illustrates further exemplary button dismissals according to embodiments of the present disclosure.

FIG. 13 illustrates enhanced button dismissal using multi-step authentication according to various embodiments of the invention. In a first example, a block 1310 is provided with a glyph 1311 at the upper corner that indicates the block may be dismissed. A user may start the multi-step dismissal by fixating at the glyph 1311. In response, a border 1312 and a confirmation element 1315 is displayed. A user subsequently gazes at the confirmation element 1315 to complete the multi-step dismissal resulting the in the block 1310 being removed from the display. Content related to the dismissal block may also be removed from or transformed within the display.

The confirmation element may be further enhanced by having a glyph change its size, shape, color or shade as part of the activation process. As shown, a block 1350 may have a dismissal glyph 1355 at a corner. As a user gaze fixates at the dismissal glyph 1355, it may display a border 1358 and confirmation element 1360, and increase its size 1370 to further enhance the next step in the dismissal process.

Figure 14:
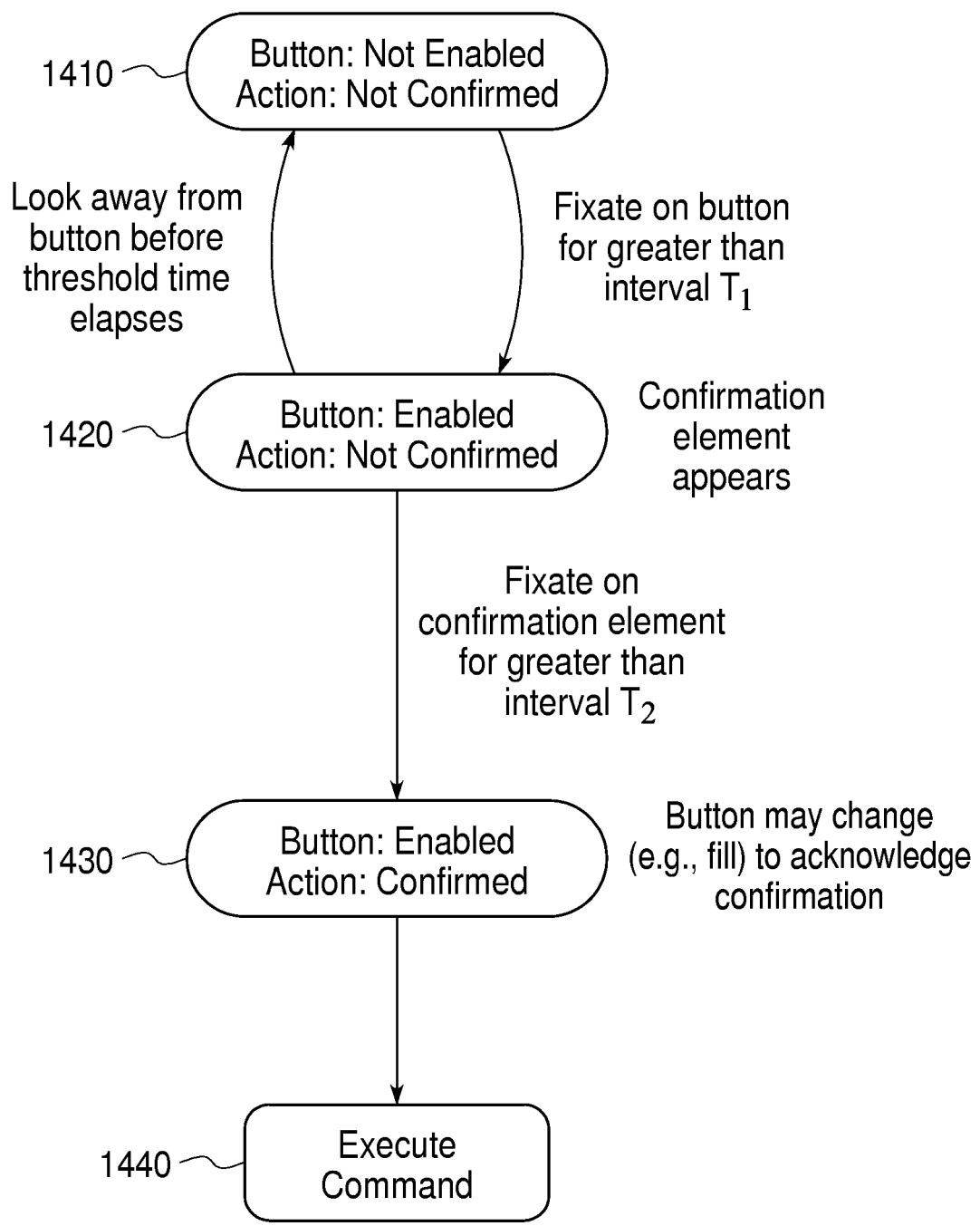
FIG. 14 illustrates a state space model showing a multi-step activation process for a button according to embodiments of the present invention.

FIG. 14 illustrates an exemplary state space model of a multi-step activation process of a button according to various embodiments of the invention. In an initial state 1410, a button is not enabled nor confirmed as the user is looking away from the button or fixating on the button for a period less than a time threshold $T_1$. The button transitions to a second state 1420 after a user fixates a gaze at the button for a period greater than the time threshold $T_1$. In this second state 1420, the button is enabled but not confirmed and a confirmation element appears.

The button transitions to a third state 1430 after a user fixates a gaze at the confirmation element for a period greater than the time threshold $T_2$. In this third state 1430, the button is enabled and confirmed resulting in an activation of the button, activation of content associated with the button and/or other response/command 1440 executed by activating the button. The button may also visually change to acknowledge confirmation.

If the button in the second state 1420 fails to transition to the third state 1430 within a predefined period of time, the button transitions to the initial state 1410.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for activating an enhanced button, the method comprising:
    displaying a first portion of the enhanced button within a display;
    identifying a first user gaze at a first location within the display, the first location being associated with the enhanced button;
    monitoring a first fixation time of the first user gaze relative to a first threshold;
    in response to the first fixation time being longer than the first threshold, displaying an a second portion of the enhanced button and an confirmation element associated with the enhanced button within the display;
    identifying a second user gaze at a second location within the display, the second location being associated with the confirmation element;
    monitoring a second fixation time of the second user gaze relative to a second threshold; and
    in response to the second fixation time being longer than the second threshold, activating the enhanced button.

2. The method of claim 1 wherein the second portion of the enhanced button is a border.

3. The method of claim 1 wherein the enhanced button is a dismissal button.

4. The method of claim 3 wherein the confirmation element is positioned proximate to a corner of the enhanced button.

5. The method of claim 1 wherein the confirmation element changes at least one of a shape, size and color in response to an initiation of the second gaze.

6. The method of claim 1 wherein the enhanced button is located in a menu within the display.

7. The method of claim 6 wherein the second portion of the enhanced button overlaps an adjacent button within the menu.

8. The method of claim 1 wherein the second portion of the enhanced button overlaps a border of a virtual block containing the first portion of the enhanced button.

9. The method of claim 1 wherein user eye movement is tracked using a contact lens having a plurality of sensors.

* * * * *